United States Patent
So (10) Patent No.: US 6,893,328 B2
(45) Date of Patent: May 17, 2005

(54) CONDUCTIVE POLISHING PAD WITH ANODE AND CATHODE

(75) Inventor: Joseph K. So, Newark, DE (US)

(73) Assignee: Rohm and Haas Electronic Materials CMP Holdings, Inc., Wilmington, DE (US)

(*) Notice: Subject to any disclaimer, the term of this patent is extended or adjusted under 35 U.S.C. 154(b) by 0 days.

(21) Appl. No.: 10/421,106

(22) Filed: Apr. 23, 2003

(65) Prior Publication Data

US 2004/0214510 A1 Oct. 28, 2004

(51) Int. Cl.[7] .................................................. B24B 1/00
(52) U.S. Cl. ......................... 451/41; 451/36; 451/286; 451/287; 451/288; 451/446; 451/908
(58) Field of Search ........................... 451/36, 41, 286, 451/287, 288, 446, 908

(56) References Cited

U.S. PATENT DOCUMENTS

| 5,807,165 A | 9/1998 | Uzoh et al. | |
|---|---|---|---|
| 5,911,619 A | 6/1999 | Uzoh et al. | |
| 6,409,904 B1 | 6/2002 | Uzoh et al. | |
| 6,497,800 B1 * | 12/2002 | Talieh et al. | 204/224 |
| 6,537,133 B1 | 3/2003 | Johansson et al. | |
| 6,544,104 B1 * | 4/2003 | Koike et al. | 451/9 |
| 6,561,873 B2 | 5/2003 | Tsai et al. | |
| 6,576,552 B2 * | 6/2003 | Kojima et al. | 438/691 |
| 6,582,281 B2 * | 6/2003 | Doan et al. | 451/41 |
| 2001/0038746 A1 | 11/2001 | Komai et al. | |
| 2002/0106881 A1 | 8/2002 | Chadde et al. | |
| 2002/0119286 A1 | 8/2002 | Chen et al. | |
| 2002/0148732 A1 | 10/2002 | Emesh et al. | |

FOREIGN PATENT DOCUMENTS

| WO | WO 00/03426 A1 | 1/2000 |
|---|---|---|
| WO | WO 00/39362 A2 | 7/2000 |
| WO | WO 02/27852 A2 | 4/2002 |

* cited by examiner

Primary Examiner—Joseph J. Hail, III
Assistant Examiner—Shantese McDonald
(74) Attorney, Agent, or Firm—Edwin Oh (57) ABSTRACT

A conductive polishing pad that includes one or more anodes and one or more cathodes formed at or near the polishing surface of a polishing pad. The anodes and cathodes are connected to a wiring network that is part of an electrical connector system that allows for a current source to be connected to the polishing pad and provide a current to the anodes and cathodes even if the polishing pad is moving relative to the current source. An electrolytic polishing fluid introduced between the polishing surface and the metal layer of a wafer forms an electrical circuit between the anode, cathode and the metal layer. The conductive polishing pad allows for electrochemical mechanical polishing (ECMP) to be performed on a conventional chemical mechanical polishing (CMP) tool.

10 Claims, 6 Drawing Sheets

CONDUCTIVE POLISHING PAD WITH ANODE AND CATHODE

BACKGROUND OF THE INVENTION

The invention relates to polishing pads for chemical mechanical planarization (CMP) and electrochemical mechanical planarization (ECMP), and in particular relates to conductive polishing pads for same.

In the fabrication of integrated circuits and other electronic devices, multiple layers of conducting, semiconducting, and dielectric materials are deposited on or removed from the surface of a semiconductor wafer. Thin layers of conducting, semiconducting, and dielectric materials are deposited by a number of deposition techniques. Common deposition techniques include physical vapor deposition (PVD), also known as sputtering, chemical vapor deposition (CVD), plasma-enhanced chemical vapor deposition (PECVD), and electrochemical plating (ECP).

As layers of materials are sequentially deposited and removed, the uppermost surface of the wafer becomes non-planar. Because subsequent semiconductor processing (e.g., metallization) requires the wafer to have a flat surface, the wafer needs to be planarized. Planarization is useful in removing undesired surface topography and surface defects, such as rough surfaces, agglomerated materials, crystal lattice damage, scratches, and contaminated layers or materials.

CMP is a common technique used to planarize substrates such as semiconductor wafers. In conventional CMP, a wafer carrier or polishing head is mounted on a carrier assembly and positioned in contact with a polishing pad in a CMP apparatus. The carrier assembly provides a controllable pressure to the wafer, urging it against the polishing pad. The pad is optionally moved (e.g., rotated) relative to the wafer by an external driving force. Simultaneously therewith, a chemical-base polishing fluid (e.g., a slurry) is flowed onto the polishing pad and into the gap between the wafer and the polishing pad. The wafer surface is thus polished and made planar by the chemical and mechanical action of the pad surface and polishing fluid.

There is presently a demand in integrated circuit (IC) manufacturing for increasing densities of backend wiring interconnects. Further, there is increasing use of IC fabrication techniques using multiple conductive layers and damascene processes with low dielectric insulators. In manufacturing ICs using these techniques, planarizing the various layers is a critical step in the IC manufacturing process.

Moreover, the mechanical aspect of CMP is reaching the limit of its ability to planarize such IC substrates because the layers cannot handle the mechanical stress of polishing. In particular, delamination and fracture of the underlayer cap and dielectric material occurs during CMP due to frictional stress induced by the physical contact between the polishing substrate and the polish pad.

To mitigate detrimental mechanical effects associated with CMP such as those described above, one approach is to perform ECMP in the manner described in U.S. Pat. No. 5,807,165 while another related approach is to perform electropolishing using a non-contact method in the manner described in International Patent No. WO 00/03426.

By way of background, ECMP is a controlled electrochemical dissolution process. The planarization mechanism is the diffusion-controlled dissolution of metals M (e.g., copper) on the substrate surface using an applied voltage.

In conventional ECMP, the electrochemical reaction takes place in the following order:
1. Charge transfer: $M \rightarrow M^+ + e^-$;
2. the accumulation of metal ions ($M^+$) on the substrate surface;
3. the acceptor diffuses to the metal surface;
4. the complex is formed between the acceptor and metal ions; and
5. the diffusion of the complex from the surface into the electrolytic polishing solution.

The acceptor during electrochemical polishing is a complexing agent in the electrochemical polishing solution. In the case of copper, the acceptor can be water and any of the known copper complexing agents. The coordination number is generally 6 and the state of copper ions is +2.

On an uneven substrate surface, prior to electrochemical polishing the charge transfer step (step 1) converts the metal (M) to metal ions ($M^+$) adsorbed on the metal on the surface. This reaction is uniform and does not smooth the surface (i.e., the surface roughness remains the same at this stage). After executing through steps 1–4, the metallic complex is formed on the metal surface. The diffusion of the metallic complex from the substrate surface into the polishing solution differs between the protruding regions and the recessed regions of the substrate surface. At the protruding regions, the complex diffuses faster than at the recessed regions, ultimately leading to a smooth substrate surface.

On the other hand, for small amounts of surface roughness, the dissolution kinetics is faster for the protruded region even in the absence of electricity because the protruding regions have a higher surface reactivity. This accelerates the planarization process when combined with the diffusion of a metallic complex and a polishing fluid with the appropriate complexing agent. Both micro-leveling and/or macro-leveling electropolishing is enhanced by the mechanical planarization effect from CMP.

In the ECMP and non-contact polishing methods such as those described in the aforementioned patents, the wafer or carrier head must be charged positive and the conductive polish pad or polishing receptacle must be charged negative. To this end, an ECMP tool is employed in which both the carrier and the polish pad are independently connected to a current controller.

It would be greatly beneficial to be able to perform both CMP and ECMP on a CMP tool. However, a conventional CMP polisher cannot be used to carry out ECMP because the carrier head is not easily modified to charge the wafer, and polishing platen or polish pad is not easily modified to conduct currents. Thus, ECMP cannot presently be performed using a CMP tool without significant and expensive physical modifications.

STATEMENT OF THE INVENTION

One aspect of the invention is a polishing pad that includes one or more anodes formed in the polishing pad at or near a polishing surface of the pad, and one or more cathodes formed at or near the polishing surface of the polishing pad, wherein the anodes and cathode are electrically isolated from each other.

Another aspect of the invention is a method of using a chemical mechanical polishing (CMP) tool to perform electrochemical mechanical polishing (ECMP) of a substrate having a metal layer. The method includes providing a polishing pad having one or more anodes formed at or near the polishing surface of the polishing pad, and one or more cathodes formed at or near the polishing surface of the polishing pad. The one or more cathodes are electrically isolated from the one or more anodes. The method also includes introducing an electrolytic polishing fluid between the metal layer and the polishing surface so to establish an electrical circuit between the one or more anodes, the metal layer and the one or more cathodes, and then providing a current to the one more anodes and one or more cathodes. The current causes electrochemical migration of metal ions from the metal layer into the electrolytic polishing solution. The method also includes pressing the substrate against the polishing pad while moving at least one of the polishing pad and the wafer.

DETAILED DESCRIPTION OF THE INVENTION

In the description below, a generalized embodiment of the conductive polishing pad of the present invention is first described. Then several specific embodiments of different polishing pad geometries are set forth for the sake of illustration. An electrical connector system for maintaining electrical connections between the anodes, cathodes and current supply when the polishing pad is in motion relative to the current supply is then described. Next, an embodiment of a polishing/planarizing system that utilizes the conductive polishing pad of the present invention is then described.

The polishing pad and systems described hereinbelow are suitable for polishing or planarizing various types of semiconductor substrates and wafers that have an uppermost metal layer, or metal portions on the surface to be polished. The present invention is also well-suited for polishing relatively brittle substrates (e.g., gallium arsenide, silicon-on-insulator, low k dielectrics, etc.) because it allows for performing ECMP planarizing/polishing with less induced mechanical stress than conventional CMP processes performed on a CMP tool.

Generalized Polishing Pad with Anode and Cathode

Figure 1:
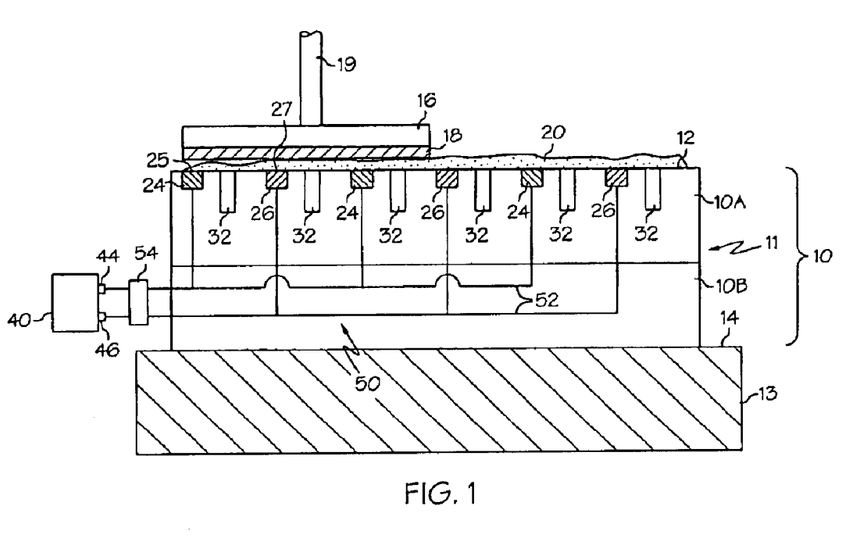
FIG. 1 is a schematic cross-sectional diagram of the polishing pad of the present invention as supported by a platen and connected to a current source, along with a substrate having a metal layer.

FIG. 1 is a schematic cross-sectional diagram of a generalized embodiment of a polishing pad 10 having a perimeter 11 and a polishing surface 12, which serves as the polishing surface. Polishing pad 10 is shown being supported by a platen 13 with an upper surface 14. A substrate (e.g., a wafer) 16 having a metal layer 18 is held in a substrate carrier 19 and positioned in contact with or in very close proximity to polishing surface 12. A polishing fluid 20 is shown between polishing surface 12 and substrate metal layer 18.

Polishing pad 10 is made of any one of the conventional polishing pad materials such as non-porous polyurethane, In particular, to prevent water adsorption, non-porous materials for polishing pad 10 include thermoplastic, thermoset, nylon, synthetic resin, polyvinylchloride, polyvinylfluoride, polyethylene, polyamide, polystrene, polypropylene, polycarbonates, polyesters, polymethacrylate, and co-polymer, such as acrylonitrile-butadiene-styrene.

Formed in polishing pad 10 are one or more first conducting elements (hereinafter "anodes") 24 and one or more second conducting elements (hereinafter "cathodes") 26. Anodes 24 and cathodes 26 (collectively referred to herein as "electrodes") are electrically isolated from one another. In an embodiment, the electrical isolation is accomplished by the pad material itself. In another embodiment, the electrical isolation is accomplished by non-conductive or insulating elements 32 arranged between the anodes and cathodes. In another embodiment, non-conductive elements 32 are formed from almost any material with a high dielectric constant and that is non-reactive to polishing fluid used. Advantageously, non-conducting elements 32 are formed from one or more of the non-porous pad materials listed above.

Anodes 24 and cathodes 26 are made of conductive material. In embodiments, the conductive material includes one or more of a metal (Al, Cu, Ag, Au, etc), metal alloys, graphite, carbon nanotubes, non-conducting fiber coated with conductive material, and conductive polymer. In certain applications where reduced defectivity is paramount, anode 24 is preferably a non-metal conductor such as conductive polymer, and cathode 26 is preferably metal, and when metal layer 18 includes copper, cathode 26 is preferably copper or a copper alloy.

Anodes 24 and cathodes 26 are formed (e.g. embedded) in polishing pad 10 at or near polishing surface 12 such that they are capable of electrically communicating with conductive material (e.g., electrolytic polishing fluid 10 or metal layer 18) at or near the polishing surface. Anodes 24 and cathodes 26 have respective surfaces 25 and 27 that are exposed at or near (i.e., above or below) pad surface 12.

With continuing reference to FIG. 1, anodes 24 and cathodes 26 are separately connected to a current source 40 at positive and negative terminals 44 and 46, respectively. This allows polishing pad 10 to conduct a current when an electrical connection is established between the anodes and cathodes. This electrical connection is established through electrically conducting polishing fluid 20, through electrical contact with metal layer 18 on substrate 16, or both.

In this embodiment, anodes 24, cathodes 26 and non-conductive elements 32 are arranged periodically in polishing pad 10, e.g., cathode/insulator/anode/pad/cathode, etc. Also in another embodiment, polishing pad 10 includes one or more grooves (not shown in FIG. 1) to facilitate the transport of slurry and/or to enhance the contact of the polishing pad to the substrate being polished. The grooves are shown and discussed in connection with FIGS. 4A and 4B, below.

Electrical Connector System

In certain types of ECMP systems (rotary polishing systems, orbital polishing systems, linear belt polishing systems and web based polishing systems), the polishing pad is moved relative to the current source. Thus, with continuing reference to FIG. 1, system 10 includes an electrical connector system 50 adapted to maintain electrical contact between the electrodes (i.e., anodes 24 and cathodes 26) and current source 40. Electrical connector system 50 is adapted to accommodate the different motions associated with the different types of systems. For example, in rotary polishers such as IPEC 472, AMAT Mirra, Speedfam Auriga, Strasburg 6DS, a side-mounted connection, through-platen connection or an endpoint cable setup, is utilized.

Polishing pad 10 includes a polishing layer 10A and a lower layer 10B, wherein anodes 24 and cathodes 26 are formed in the polishing layer, and a wiring network 52 as part of electrical connector system 50 is formed in the lower layer. Wiring network 52 connects anodes 24 to current source 40 at positive terminal 44 and connects cathodes 26 to current source 40 at negative terminal 46. These connections are made using an electrical connector 54, also part of electrical connector system 50, arranged between wiring network 52 and current source 40.

Wiring network 52 includes leads 56A and 56B that traverse perimeter 11 of layer 10B. Electrical connector 54 (or alternatively current source 40 with leads 44 and 46) is then placed in electrical contact with leads 56A and 56B, and remain in electrical contact with wiring network 52 while polishing pad 10 rotates.

In another embodiment, a portion of wiring network 52 is formed in layer 100B and is connected to one of the electrodes (e.g., anodes 24), while another portion of the wiring network is formed in a third pad layer (not shown) and is connected to the remaining electrodes (e.g., cathodes 26).

Wiring network 52 is formed using any one of a number of know techniques. In one embodiment, a lithographic technique is employed wherein a first insulating layer is spin-coated onto pad layer 10B, followed by patterned etch to form electrically isolated cathode and anode trenches. The trenches are then filled with a conductive material to form wiring network 52. In an alternative embodiment, this process is repeated in a third pad layer (not shown) to form the two-layered wiring network discussed above.

In another embodiment, wiring network 52 is formed directly in platen 13 rather than in polishing pad 10.

Polishing Pad Parameters

Table 1 below provides two example ranges for the polishing pad thickness, groove pitch, groove width, groove depth, anode thickness, cathode thickness, and anode/cathode spacing, for embodiments of polishing pad 10.

TABLE 1

Polishing pad parameter ranges.

| Parameter | First Range (mil) | Second Range (mil) |
| --- | --- | --- |
| Pad Thickness | 50–200 | 80–160 |
| Groove Pitch | 60–360 | 60–300 |

TABLE 1-continued

Polishing pad parameter ranges.

| Parameter | First Range (mil) | Second Range (mil) |
| --- | --- | --- |
| Groove Width | 10–100 | 20–80 |
| Groove Depth | 15–100 | 15–75 |
| Anode Thickness | 10–200 | 20–150 |
| Cathode Thickness | 10–200 | 30–150 |
| Anode/Cathode spacing | 1–200 | 10–150 |

Anodes 24 and cathodes 26 can have a variety of shapes, such a circular, square, rectangular, polygonal, circular, arcuate, etc. Several different possible shapes for the anodes and cathodes are illustrated below.

Polishing Pad 1

Figure 2A:
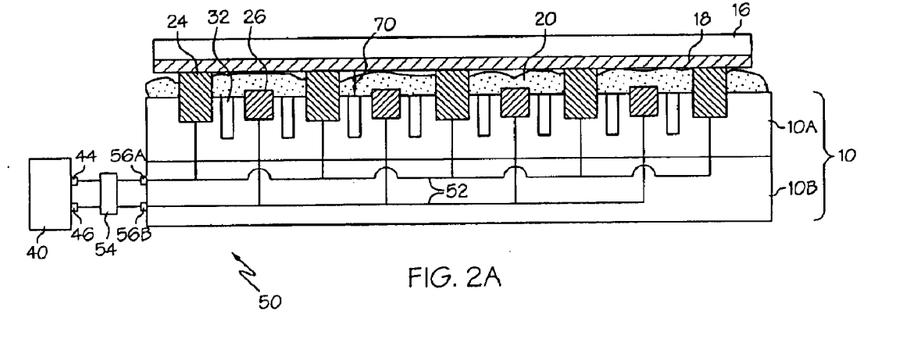
FIG. 2A is a schematic cross-sectional diagram similar to FIG. 1, wherein the polishing pad has anodes extending higher than the cathodes and the insulating elements relative to the pad's polishing surface.
Figure 2B:
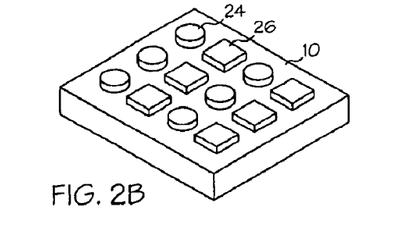
FIG. 2B is an isometric view of the polishing surface of the polishing pad of FIG. 2A showing the anodes and the cathodes.

FIG. 2A is a schematic cross-sectional diagram similar to FIG. 1, illustrating an embodiment of polishing pad 10 wherein anodes 24 extended higher than both cathodes 26 and insulating elements 32 relative to polishing surface 12. FIG. 2B is an isometric view of polishing pad 10 of FIG. 2A showing anodes 24 and cathodes 26.

The electrode geometry of pad 10 of FIGS. 2A and 2B allows anodes 24 to contact metal layer 18 of substrate 16, while also allowing for a small space 70 to exist between cathodes 26 and metal layer 18 of substrate 16. Space 70 allows electrolytic polishing fluid 20 to flow between metal layer 18 and cathodes 26. When space 70 is small, arcing or short-circuiting of the electrical path can occur if the current from current source 40 is too high. In this embodiment, space 70 is, for example, between 1–200 mil.

Polishing Pad 2

Figure 3A:
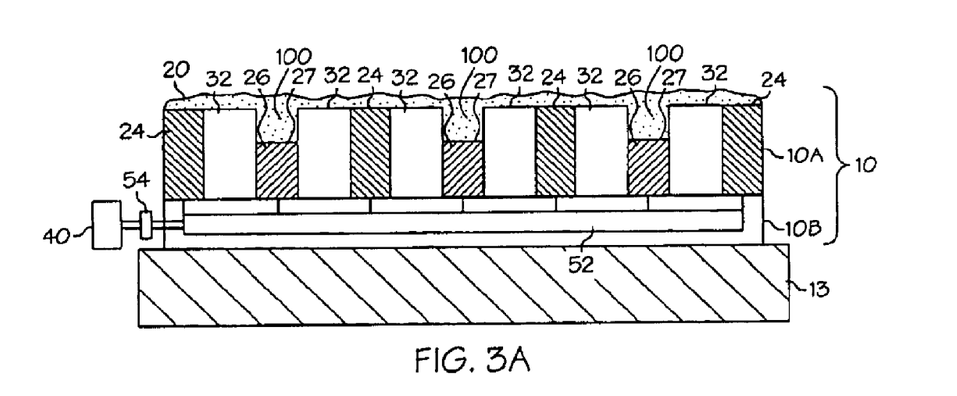
FIG. 3A is a schematic cross-sectional diagram similar to FIG. 1, wherein the polishing pad cathodes are located in indents formed in the pad's polishing surface.
Figure 3B:
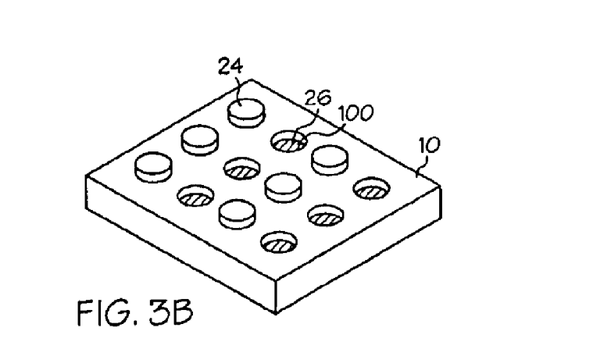
FIG. 3B is an isometric view of the polishing surface of the polishing pad of FIG. 3A showing the anodes and the cathodes.

FIG. 3A is a schematic cross-sectional diagram similar to FIG. 1, illustrating an embodiment of polishing pad 10 wherein cathodes 26 are located in indents 100 formed in polishing surface 12. FIG. 3B is an isometric view of polishing pad 10 of FIG. 2A. The polishing pad material between anodes 24 and cathodes 26 serves as insulating elements 32. Electrolytic polishing fluid 20 establishes an electrical connection between cathodes 26 and metal layer 18 (not shown in FIG. 3A; see FIG. 1) by collecting in indents 100 and contacting cathode surfaces 27.

Polishing Pad 3

Figure 4A:
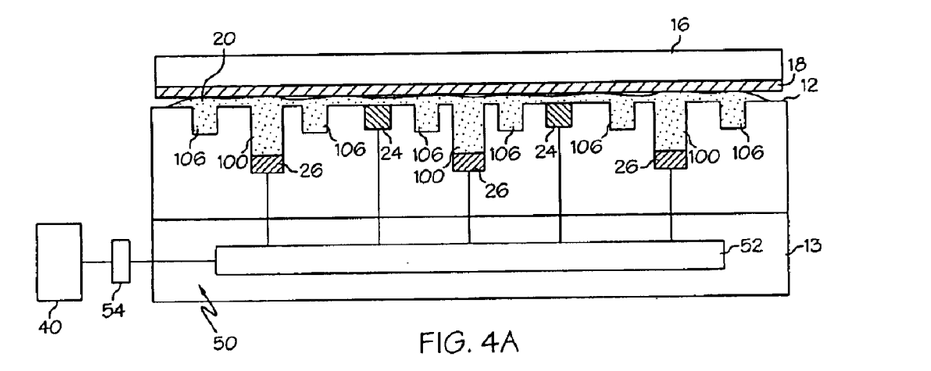
FIG. 4A is a schematic cross-sectional diagram similar to FIG. 1, wherein the polishing pad further includes grooves formed in the pad's polishing surface.
Figure 4B:
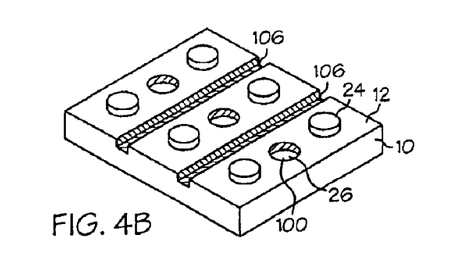
FIG. 4B is an isometric view of the polishing surface of the polishing pad of FIG. 4A showing the anodes, the cathodes and the grooves.

FIG. 4A is a schematic cross-sectional diagram similar to FIG. 1, illustrating an embodiment of polishing pad 10 identical to that shown in FIG. 3A, and further including grooves 106 formed in the polishing surface. FIG. 4B is an isometric view of polishing pad 10 of FIG. 4A. Grooves 106 facilitate the transportation of electrolytic polishing fluid 20 between polishing surface 12 and metal layer 18 of substrate 16. Example groove parameters are listed in Table 1, above.

Polishing Pad 4

Figure 5:
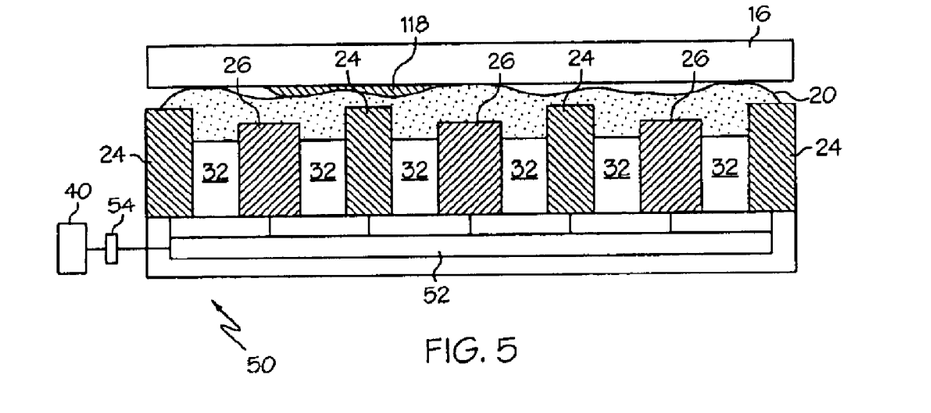
FIG. 5 is a schematic cross-sectional diagram similar to FIG. 1, wherein the polishing pad anodes, cathodes and insulating elements have a variable size.

FIG. 5 is a schematic cross-sectional diagram similar to FIG. 1, illustrating an embodiment of polishing pad 10, wherein anodes 24, cathodes 26 and insulating elements 32 each have a variable size. Substrate 16 as shown in FIG. 5 has a residual metal island 118 formed, for example, from polishing or otherwise processing a previously existing metal layer 18.

A large anode surface area reduces contact resistance, thus requiring less current from current source 40. A larger cathode surface area increases the rate of electrochemical polishing (i.e., results in a faster removal rate). However, if each of anodes 24 has a large surface area, the ability to remove very small (micrometer size) electrically isolated metal islands 118 is reduced. Accordingly, it is advantageous that embodiments of polishing pad 10 have anodes and cathodes of different sizes. In another embodiment, polishing pad 10 is divided into different zones, wherein within each zone, the anodes and cathodes have a fixed size.

Controlling the amount of current from current source 40 results in removing residual metal islands 118 at a controlled rate.

Polishing Pad

Figure 6:
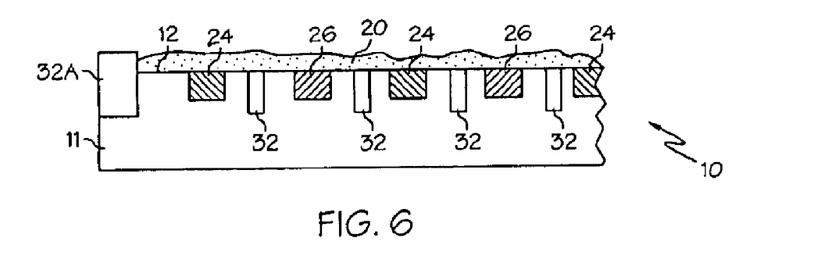
FIG. 6 is a schematic partial cross-sectional view of an embodiment of the polishing pad of FIG. 1, wherein an insulating element located at the pad perimeter extends above the pad's polishing surface.

FIG. 6 is a schematic partial cross-sectional view of an embodiment of polishing pad 10, wherein an insulating element 32A located at perimeter 11 of the pad extends above polishing surface 12. This geometry allows electrolytic polishing fluid 20 to collects on the polishing surface, thereby enhancing the CMP or ECMP process, particularly in applications where rotational or linear motion of the polishing pad is medium to high.

CMP System for Performing ECMP

Figure 7:
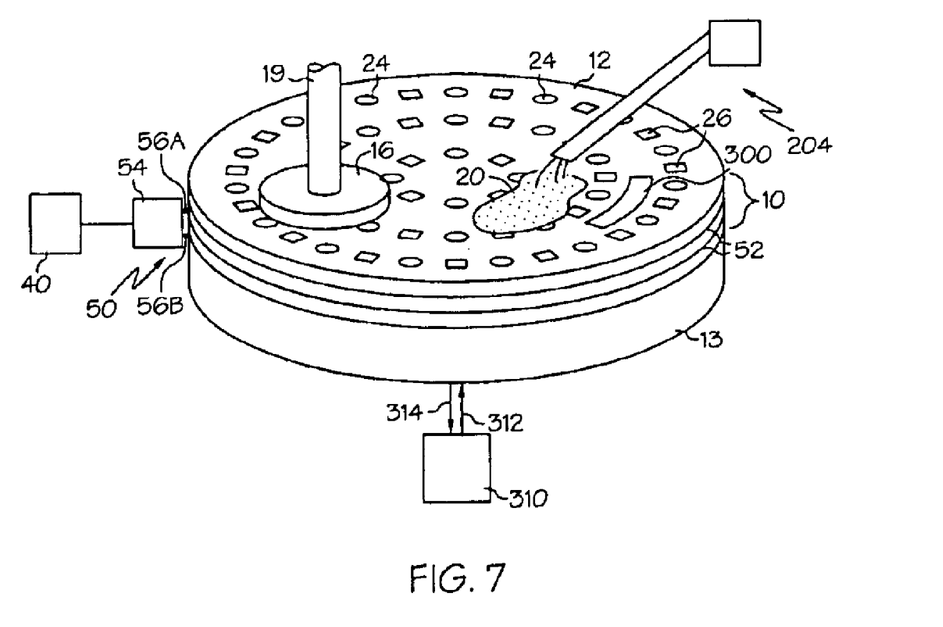
FIG. 7 is a perspective view of a CMP system 200 that utilizes the polishing pad of FIG. 1 to perform ECMP on the CMP system.

FIG. 7 is a perspective view of a CMP system that includes the elements shown in FIG. 1, and further includes a polishing fluid delivery system 204 for depositing polishing fluid 20. Polishing pad 10 is shown as having circular anodes 24 and square cathodes 26. Further, while the CMP system of FIG. 7 is a rotational system, the principles discussed below apply to other types of CMP systems such as linear or web systems.

In the operation of the CMP system shown in FIG. 7, substrate (e.g., wafer) 16 is loaded into substrate carrier 19 and positioned over polishing surface 12. Electrolytic polishing fluid 20 is flowed from polishing fluid delivery system 204 to polishing (upper) surface 12 of polishing pad 10. Substrate carrier 19 is then lowered so that substrate 16 is pressed against polishing surface 12. Polishing pad 10 and/or substrate carrier 10 is optionally put into motion, e.g., via rotation of platen 13. A current (AC or DC) is flowed from current source 40 to anodes 24 and cathodes 26 via electrical connector 54 and wiring network 52 of electrical connector system 50.

When electrolytic polishing fluid 20 makes contact with anodes 24, cathodes 26 and metal layer 18 of substrate 16 (see e.g., FIG. 1), an electrical circuit is formed. In response to the negative electrical potential at cathodes 26, metal ions migrate away from metal layer 18. The metal ion migration effect is localized to those regions of the metal layer closest to cathodes 26. By placing the substrate in motion relative to polishing surface 12, the migration effect is averaged out over the metal layer.

The removal rate of metal from metal layer 18 of substrate 16 is determined by the current density and current waveform provided to anodes 24 and cathodes 26 by current source 40. Metal layer 18 is ionized by virtue of the electric potential between the anodes and cathodes. The metal ions dissolve into electrolytic polishing solution 20 that flows between polishing surface 12 and metal layer 18. The metal dissolution rate is proportional to the electric current density provided by current source 40. The electropolishing removal rate increases with higher the polishing current density. However, as the current density increases, the probability of damaging microelectronic components increases. In this embodiment, a current density in the range 0.1–120 mA/cm$^2$ is, for example, used. In an embodiment wherein a relatively high rate of metal removal is desired, the current density is, for example, between 30 and 120 mA/cm$^2$. Where a relatively low rate of metal removal is desired, the current density is, for example, between 0.1 and 30 mA/cm$^2$.

Because polishing or planarizing using the CMP system of FIG. 7 utilizes an electrochemical reaction, the downward force exerted by substrate carrier 19 is less than that required for performing conventional CMP. Accordingly, the contact friction is less than in conventional CMP, which results in a reduced mechanical stress on the exposed metal layer as well as any underlying layers.

When initiating polishing substrate 16 using a CMP system such as shown in FIG. 7, a relatively high removal rate is used to rapidly remove the bulk metal layer 18 (FIG. 1). When it is determined (e.g., via optical end-point detection) that most of metal layer 18 is removed (e.g., by detecting breakthrough of the underlying layers), the system parameters are changed to decrease the removal rate. Various current wave-forms (e.g., pulse, bipolar pulse, variable magnitude pulse, continuous current, constant voltage, alternating polarity, modified sine-wave, and others) generated by current source 40 are then used to polish or planarize the thickness variation created during electroplating. In practice, different current densities and waveforms are used in conjunction with localized metal migration to smooth out the otherwise uneven deposition of metal on the substrate.

When electrically isolated residual metal 118 (see FIG. 5) is present on substrate 16, barrier and dielectric materials (not shown) underlying the metal layer are exposed. In this instance, only the residual metal forms an electrical circuit so that only the residual metal is removed from the substrate. This mechanism results in reduced dishing after electropolishing. Because the surface area of cathodes 26 is larger than that of the small damascene features formed in the substrate and underlying the metal layer, the metal forming the damascene structure is not removed.

Also, high polishing pad asperity causes dishing within the damascene trenches due to pad material bending and penetrating into the damascene trenches. Thus, in another embodiment, polishing surface 12 has asperities (i.e., a surface roughness Ra) less than 3 um.

Often, metal layer 18 is formed via electroplating and has a thickness profile that is thicker at the edge than at the center. Thus, the removal rate of metal from the metal layer can be varied over the metal layer by providing different amounts of current to the anodes and cathodes, depending on their location. In particular, selective metal removal is accomplished by defining different pad zones, and applying a different current to each zone. In another embodiment, the applied current is provided in proportion to the cathode surface area, or in proportion to the metal layer thickness profile.

As discussed above, the addition of electrochemical polishing capability to a CMP system via polishing pad 10 reduces the pressure with which substrate 16 is pressed to the polishing pad. In this embodiment, this pressure is, for example, 3 psi or less. Such a relatively small pressure reduces mechanical stress. Further, where no abrasive is included in the electrolytic polishing solution 20, the risk of mechanical scratching is reduced.

In another embodiment, only substrate carrier 19 is rotated to reduce polishing non-uniformity. Optionally, only platen 13 is rotated. Further, in another embodiment, both substrate carrier 19 and platen 13 are rotated.

In another embodiment, the rotation of substrate carrier 19 and platen 13 is, for example, less than 100 revolutions-per-minute (rpm), preferably less than 60 rpm for high removal rate, and less than 30 rpm for low removal rate. Also in another embodiment, substrate carrier oscillation is utilized to uniformized polishing or planarization. In this optional embodiment, the oscillation of substrate carrier 19 is, for example, 5 cm/sec or less. On orbital polisher, carrier oscillation is not necessary due to the motion of the platen.

With continuing reference to FIG. 7, polishing pad 10 includes a transparent window 300 and the CMP system further includes an optical endpoint detection system 310 in periodic optical communication with substrate 16 through window 300. An example of an optical endpoint detection system is the Mirra ISRM system manufactured by Applied Materials, Inc, San Jose, Calif. AMAT. System 300 transmits a light beam 312 through window 300 to substrate 16 when the window is aligned with system 300 and the substrate. System 300 detects a light beam 314 reflected from substrate 16 to determine whether the pattern underlying metal layer 18 is exposed. System 300 allows for the selective application and control of the current density provided by current source 40 to reduce the damage to any microelectronic components (not shown) embedded within substrate 16.

Endpoint detection is generally used to terminate or alter the polishing process. In another embodiment, endpoint detection is used in conjunction with controlling the current from current source 40 to polish residual metal islands 118 (FIG. 5) after bulk material (e.g., metal layer 18) is substantially removed. Use of a high current after "break through" of metal layer 18 can damage electronic components formed in substrate 16. Another technique for performing end-point detection involves monitoring the resistance between anodes 24 and cathodes 26.

To maintain a height differential between cathode and anode during polishing where such a differential initially exists, and to otherwise prevent build up of metal byproduct on polishing surface 12, conditioning or cleaning of the polishing surface with a brush and/or with a cleaning solution is recommended.

An advantage of present invention is that the electropolishing process can polish electrically isolated metal residue (e.g., islands 118) on a semiconductor substrate. Damage to active microelectronic components and mechanically induced CMP defects are reduced by electropolishing the electrically isolated metal residue while limiting the path of current flow to embedded microelectronic components.

What is claimed is:

1. A polishing pad comprising:
    one or more anodes formed in the polishing pad at or near a polishing surface of the polishing pad; and
    one or more cathodes formed in the polishing pad at or near the polishing surface of the polishing pad and electrically isolated from the one or more anodes.

2. The polishing pad of claim 1, further including non-conducting elements formed in the polishing pad to provide the electrical isolation between the one or more anodes and the one or more cathodes.

3. The polishing pad of claim 1, further including a wiring network connected to the one or more anodes and the one or more cathodes.

4. The polishing pad of claim 3, further including:
    an electrical connector electrically connected to the wiring network and adapted to maintain electrical contact with the wiring network when the polishing pad is in motion.

5. The polishing pad of claim 4, further including:
    a current source electrically connected to the electrical connector and adapted to provide a current to the one or more anodes and the one or more cathodes through the electrical connector and the wiring network.

6. The polishing pad of claim 1, further including one or more grooves formed in the polishing surface of the polishing pad.

7. The polishing pad of claim 1, further including a transparent window.

8. A method of using a chemical mechanical polishing (CMP) tool to perform electrochemical mechanical polishing (ECMP) of a substrate having metal formed thereon, the method comprising:
    providing a polishing pad having one or more anodes formed in the polishing pad at or near a polishing surface of the polishing pad, and one or wore cathodes formed in the polishing pad at or near the polishing surface of the polishing pad and electrically isolated from the one or more anodes;
    introducing an electrolytic polishing fluid between the substrate and the polishing surface so as to establish an electrical circuit between the one or more anodes, the metal, and the one or more cathodes;
    providing a current to the one or more anodes and the one or more cathodes to cause electrochemical migration of metal ions from the metal into the electrolytic polishing solution; and
    pressing the substrate against the polishing surface while moving at least one of the polishing pad and the substrate.

9. The method of claim 8, wherein moving at least one of the polishing pad and the wafer includes rotating at least one of the polishing pad and the substrate.

10. The method of claim 8, wherein the current is proportional to a removal rate of metal, and including providing different amounts of current to select anodes and cathodes to vary the removal rate of metal over the metal layer.

* * * * *